United States Patent
Tanaka et al.

(10) Patent No.: US 7,231,116 B2
(45) Date of Patent: Jun. 12, 2007

(54) FILTER MODULE

(75) Inventors: Hiroyuki Tanaka, Osaka (JP); Takashi Fukuzawa, Osaka (JP); Shigeo Kittaka, Osaka (JP); Leandro de Castro, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 10/680,886

(22) Filed: Oct. 8, 2003

(65) Prior Publication Data

US 2004/0114932 A1 Jun. 17, 2004

(30) Foreign Application Priority Data

Oct. 8, 2002 (JP) .............................. 2002-295012

(51) Int. Cl.
*G02B 6/32* (2006.01)
(52) U.S. Cl. ...................... 385/34; 385/33; 385/47; 385/24
(58) Field of Classification Search .................. 385/16, 385/33, 34, 24
See application file for complete search history.

(56) References Cited

U.S. PATENT DOCUMENTS

| | | | | |
|---|---|---|---|---|
| 4,111,524 A | * | 9/1978 | Tomlinson, III | 385/37 |
| 4,474,424 A | * | 10/1984 | Wagner | 385/24 |
| 4,521,071 A | * | 6/1985 | Bohm | 385/34 |
| 5,799,121 A | * | 8/1998 | Duck et al. | 385/47 |
| 6,044,187 A | * | 3/2000 | Duck et al. | 385/33 |
| 6,477,289 B1 | * | 11/2002 | Li | 385/16 |
| 6,499,886 B1 | * | 12/2002 | Mizuno et al. | 385/70 |
| 6,717,733 B2 | * | 4/2004 | Sato et al. | 359/619 |
| 2003/0099430 A1 | * | 5/2003 | Li et al. | 385/18 |
| 2004/0047558 A1 | * | 3/2004 | Yasuda et al. | 385/33 |

FOREIGN PATENT DOCUMENTS

WO   WO 96/19743   6/1996

\* cited by examiner

*Primary Examiner*—Frank G. Font
*Assistant Examiner*—Eric Wong
(74) *Attorney, Agent, or Firm*—Boyle Fredrickson Newholm Stein & Gratz S.C.

(57) ABSTRACT

A filter module is provided for an optical communications system. The filter module includes a lens, three optical fibers, an optical filter, and a mirror. The three optical fibers are arranged on a single side of the lens. The lens includes a first face coated with the optical filter and that faces the mirror. The optical fibers are arranged on a second face of the lens. A cascade of the filter modules are configured to connect and form a multiplexing/demultiplexing unit.

11 Claims, 10 Drawing Sheets

FILTER MODULE

BACKGROUND OF THE INVENTION

The present invention relates to a filter module constructed as a demultiplexing/multiplexing module suitable for an optical communication system based on the wavelength division multiplexing (WDM) and dense wavelength division multiplexing (DWDM) transmission modes.

In general, in conventional optical communication systems, a large number of demultiplexing modules are used to demultiplex (split) demultiplexing (splitting) wavelength multiplex signals transmitted through optical fiber into the individual wavelength signals and a large number of multiplexing modules are used to multiplex (combine) a plurality of optical signals different in wavelength into an optical fiber (for example, National Publication of International Patent Application No. 10-511476).

Figure 10:
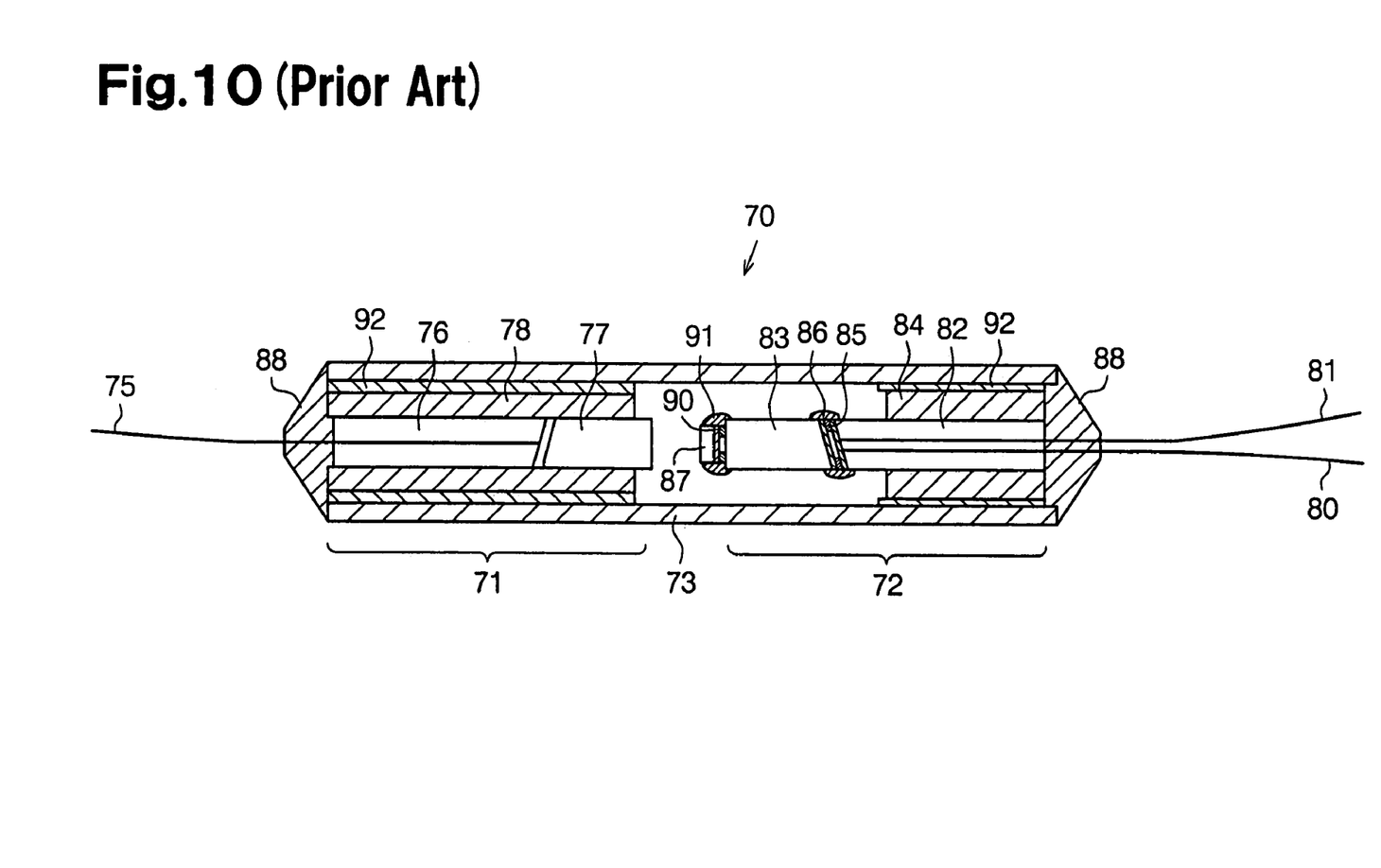
FIG. 10 is a schematic sectional view showing the configuration of a conventional three-port filter module.

Additionally, three-port filter modules as shown in FIG. 10 have been conventionally used as filter modules capable of demultiplexing/multiplexing of an optical signal in a particular wavelength band.

As shown in FIG. 10, such a filter module comprises a single optical fiber collimator (hereinafter referred to as "single FC") 71 and a dual optical fiber collimator (hereinafter referred to as "dual FC") 72, and a cylindrical tube 73 for integrally holding both FC's 71, 72.

The single FC 71 comprises a single-core capillary 76 for holding an optical fiber 75, a refractive index distribution type rod lens 77, and a tube 78 for integrally holding these components. The two opposing faces of the single-core capillary 76 and rod lens 77 are each polished so as to be inclined. The single-core capillary 76 and the rod lens 77 are subjected to core alignment for the purpose of preventing the inclination deviation, and are fixed in the tube 78 with the aid of an adhesive so that the core aligned arrangement may be maintained.

On the other hand, the dual FC 72 comprises a two-core capillary 82 for integrally holding two optical fibers 80, 81 and a refractive index distribution type rod lens 83. The two opposing faces of the two-core capillary 82 and rod lens 83 are each polished so as to be inclined. The two-core capillary 82 and the rod lens 83 are subjected to core alignment and are jointed to each other, with the aid of the rings of an adhesive 85 applied onto the peripheries of the two opposing end faces, for the purpose of maintaining the core aligned arrangement. Additionally, the jointed parts are bonded to each other with the aid of an adhesive 86 for reinforcement covering the jointed parts. Yet additionally, an inserted short tube 84 is made to fit around the two-core capillary 82.

After both FC's 71, 72 have been fabricated, a board with a wavelength selective transmitting film (filter) 87 is bonded onto the front face of the dual FC 72, namely, the end face of the rod lens 83 with the aid of an adhesive 90 in a core aligned manner. Additionally, the bonded parts are bonded with the aid of an adhesive 91 for reinforcement covering the bonded parts.

Subsequently, both FC's 71, 72 are subjected to a mutual core alignment, both FC's are bonded in the interior of the tube 73 with the aid of an adhesive 92 for the purpose of maintaining the core aligned arrangement.

The position of both open ends of the tube 73 are respectively made to coincide with the positions of the end faces of both FC's 71, 72. Additionally, a resin based adhesive 88 is applied onto the respective end faces for the purpose of holding the optical fiber 75 and the optical fibers 81, 80. Thus, the filter module shown in FIG. 10 is fabricated.

According to the filter module constituted as described above, a wavelength multiplexed optical signal is input into or output from one of the two optical fibers 80, 81 of the dual FC 72 (for example, the optical fiber 80), and an optical signal of the wavelength band reflected on the filter 87 is input into or output from the other optical fiber (for example, the optical fiber 81). Additionally, an optical signal in the wavelength band selectively passing through the filter 87 is input into or output from the optical fiber 75 provided in the single FC 71.

In this connection, the conventional filter module has the following problems.

(1) The size of the filter module is large. Additionally, the three ports are arranged apart at both ends of the module. Accordingly, when a plurality of filter modules are connected in cascade to form a multichannel demultiplexing/multiplexing unit, a large space is needed for wiring the individual filter modules and optical fibers for connecting the filter modules. More specifically, when wiring is made by bending the optical fibers, a large space is needed, which permits ensuring the curvature radii of the fibers sufficiently large (for example, 30 mm or more) to prevent the break damage of the optical fibers. Thus, the size of the fabricated multichannel demultiplexing/multiplexing unit becomes large, and it is difficult to reduce the size thereof.

(2) The number of components is large, which leads to the increase in fabrication cost.

(3) The number of the processes for core alignment and fixation is large; more specifically, the following processes (a) to (c) for core alignment and fixation are needed.

(a) A process, in the fabrication of a single FC 71, for core alignment of the optical fiber 75 and the rod lens 77, and fixation thereof.

(b) A process, in the fabrication of a dual FC 72, for core alignment of the two-core capillary 82 and the rod lens 83, and fixation thereof.

(c) A process for core alignment of the single FC 71 and the dual FC 72, and fixation of both in the tube 73 when both FC's 71, 72 are fixed in the tube 73.

(d) A process for core alignment and fixation of the filter 87 to the rod lens 83 when the filter 87 is bonded onto the end face of the rod lens 83.

As described above, three or four processes for core alignment and fixation are needed, which results in elongation of the fabrication time, increase of the fabrication cost, and reliability degradation of the product characteristics of the filter module.

SUMMARY OF THE INVENTION

The present invention is a response to such conventional problems as described above, and an object of the present invention is to provide a filter module that is small in size, low in cost, and high in reliability by simplifying the configuration, and by making the fabrication procedure easier.

To achieve the foregoing and other objectives and in accordance with the purpose of the present invention, a filter module comprising a lens, three optical fibers, an optical filter, and a mirror is provided. The three optical fibers are arranged on a single side of the lens.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

Description will be made below on a first embodiment of a three-port filter module that embodies the present invention on the basis of FIGS. 1 to 3.

Figure 1:
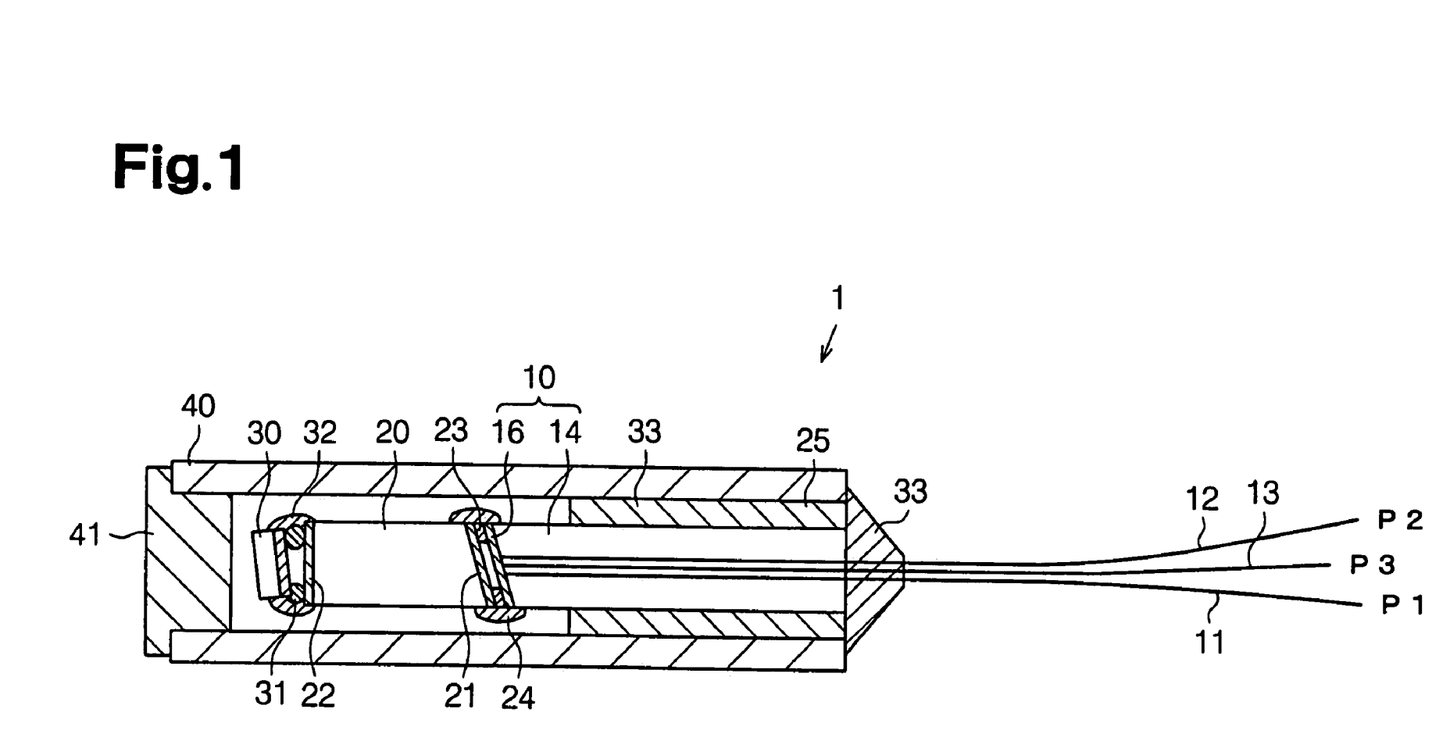
FIG. 1 is a schematic sectional view showing the configuration of a filter module in one embodiment of the present invention.

As FIG. 1 shows, a filter module 1 comprises an optical fiber chip 10, and a refraction index distribution type rod lens 20 as a lens disposed to be core aligned to the light outgoing face of the optical fiber chip 10. Additionally, the filter module 1 comprises a board with a wavelength-independent total reflection mirror 30, disposed in a manner core aligned to the end face of the rod lens 20 (hereinafter simply referred to as "mirror"), and an outer tube 40.

The optical fiber chip 10 comprises three optical fibers 11, 12, 13, and a capillary 14. As FIGS. 2(a) and (b) show, a through hole 15 is formed in the capillary 14, and the three optical fibers 11, 12, 13 are inserted into the through hole 15. In the through hole 15, the three optical fibers 11, 12, 13 are fixed and held with the aid of an adhesive. The capillary 14 is cylindrical, made of glass, and 1.8 mm in diameter. One end face of the capillary 14 is aligned with the end faces of the optical fibers 11, 12, 13, and is an inclined face 14a polished so as to have a prescribed inclination angle (for example 8 degrees) in relation to a flat plane normal to the direction of the axis of the cylinder. As FIG. 3 shows, an anti-reflection film 16 is formed on the inclined face 14a. The anti-reflection film 16 is formed simultaneously both on the inclined face 14a of the capillary 14 and on the end faces of the three optical fibers 11, 12, 13. The light reflectance of the anti-reflection film 16 is 0.2% or less.

Figure 2A:
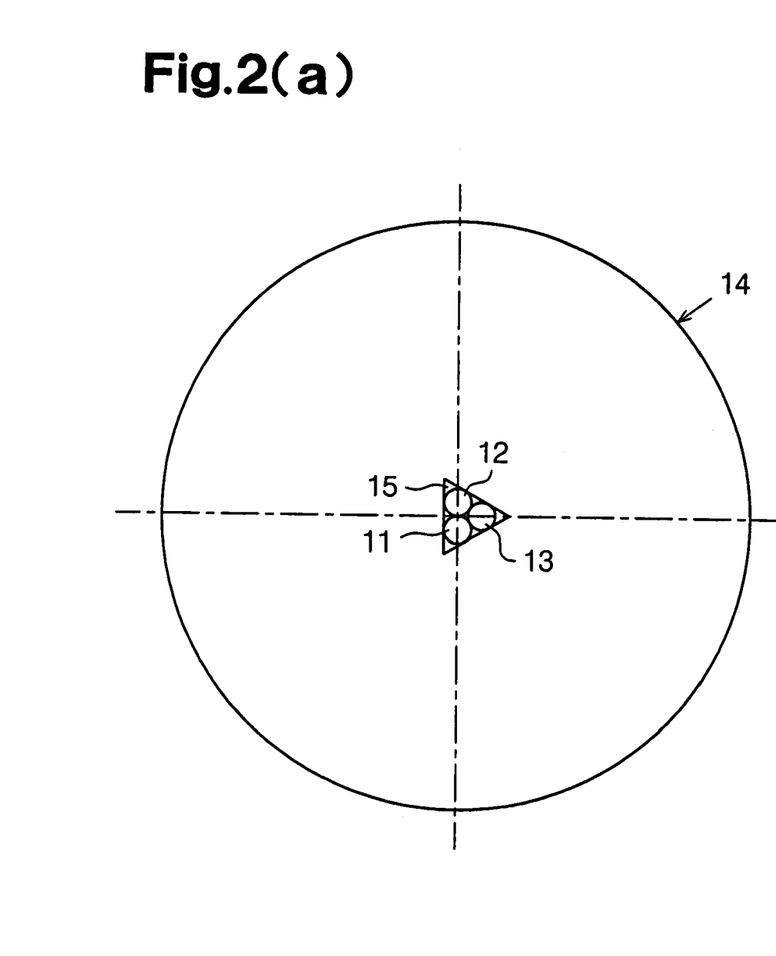
FIGS. 2(a) and (b) are a front view and a side view of a capillary in an optical fiber chip, respectively.
Figure 2B:
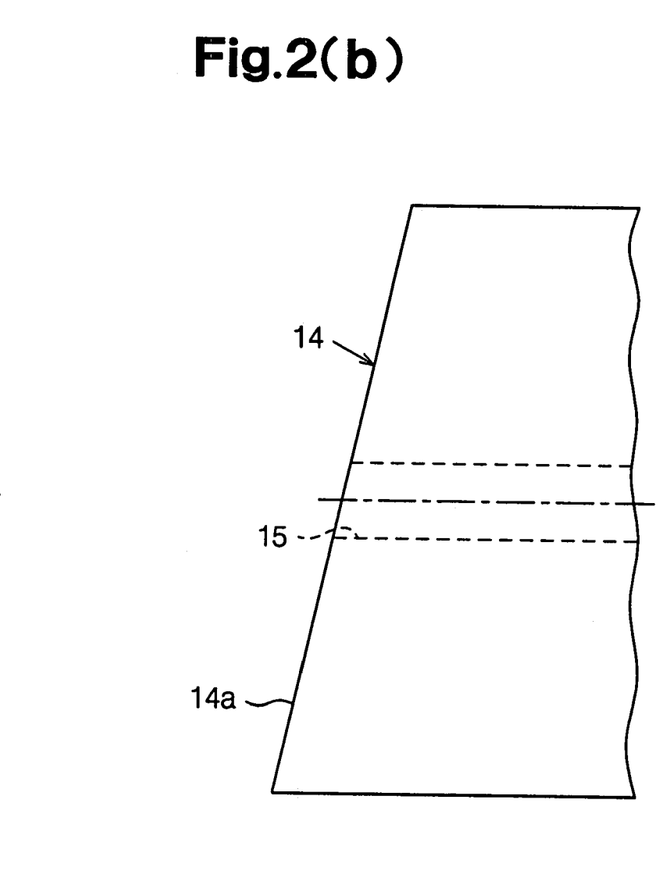

As FIG. 2(a) shows, the three optical fibers 11, 12, 13 are all circular in cross section, and are inserted into the through hole 15 in a manner bundled so as to be circumscribed by each other. The cross section of the through hole 15 is approximately triangular, and the inner wall faces of the through hole 15, each in one-to-one correspondence with a side of the approximate triangle, are respectively in contact with the three sets of two optical fibers of the three optical fibers 11, 12, 13. Additionally, the through hole 15 passes through the capillary 14 in such a way that the line of contact between two optical fibers (in the present embodiment, a first optical fiber 11 and a second optical fiber 12) of the three optical fibers 11, 12, 13 coincides with the central axis of the capillary 14.

In the present embodiment, the diameter of the rod lens is 1.8 mm, and the sinusoidal period of a light ray traveling in the lens is a pitch of 0.25.

Figure 3:
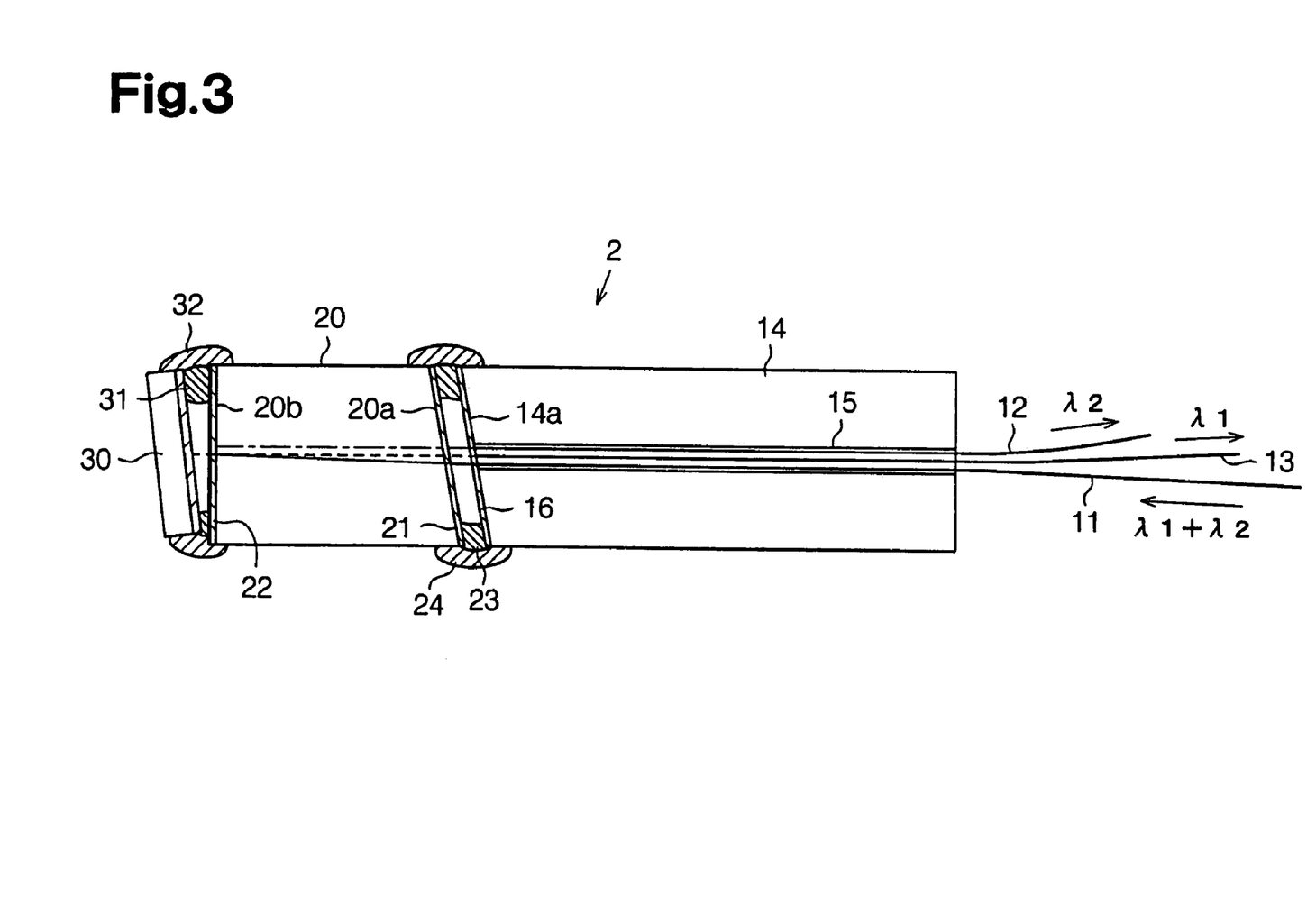
FIG. 3 is a sectional view of a core module involved in one embodiment.

As FIGS. 1 and 3 show, the right end face of the rod lens 20 is an inclined face 20a polished so as to have a prescribed inclination angle (for example 8 degrees) in relation to a plane normal to the optical axis of the rod lens 20. Additionally, the left end face of the rod lens 20 is a flat face 20b polished so as to be normal to the optical axis.

An anti-reflection film 21 is formed on the inclined face 20a of the rod lens 20. In the present embodiment, the light reflectance of the anti-reflection film 21 is 0.2 or less.

Additionally, a wavelength selective transmitting film (hereinafter referred to as an "interference film filter") 22 as an optical filter is formed on the flat face 20b of the rod lens 20.

In the present embodiment, the interference film filter 22 is a bandpass filter, which transmits the light rays in a particular wavelength band $\lambda 1$ ranging from a few nanometers to a few tens nanometers falling in the light wavelength region used in the optical communication, and reflects the light in the wavelength band $\lambda 2$ other than the wavelength band $\lambda 1$.

For the optical fiber chip 10 and the rod lens 20, the inclined face 14a of the capillary 14 and the inclined face 20a of the rod lens 20 are made to face each other and the axial alignment and inclination adjustment, namely, the core alignment is conducted. For the purpose of maintaining the core aligned arrangement, the optical fiber chip 10 and the rod lens 20 are bonded to each other with the aid of a ring of an adhesive 23 placed in the gap between both inclined faces 14a, 20a.

In the present embodiment, a non-filler type ultraviolet curing resin adhesive high in viscosity is used as the adhesive 23. Accordingly, the adhesive 23 does not get into the optical path around the centers of both inclined faces 14a, 20a.

Furthermore, the joint portions are bonded to each other with an adhesive 24 for reinforcement covering the joint portions. In the present embodiment, an epoxy resin based thermosetting adhesive is used as the adhesive 24; after joint portions have been bonded, heating is made at 100° C. for 6 hours in the air atmosphere. Herewith, the optical fiber chip 10 and the rod lens 20 are fixed to each other.

In the present embodiment, the mirror 30 is formed by forming a multilayer film made of dielectric thin films having wavelength independence on a one mm thick substrate made of glass, and the light reflectance thereof is 99.5% or more for the light in the wavelength region for use in the optical communication.

As FIG. 3 shows, the mirror 30 is subjected to core alignment in relation to the flat face 20b of the rod lens 20, and is bonded onto the flat face 20b with the aid of a ring of an adhesive 31 in conformity with the prescribed separation from the flat face 20b for the purpose of maintaining the core aligned arrangement.

In the present embodiment, a non-filler type ultraviolet curing resin adhesive high in viscosity is used as the adhesive 31. Accordingly, the adhesive 31 does not get into the optical path around the centers of the flat face 20b and the mirror 30.

Furthermore, the joint portions are bonded to each other with the aid of an adhesive 32 for reinforcement covering the joint portions. Thus, the core module 2 of the filter module 1 is constructed, as shown in FIG. 3.

Now, the two types of core alignment and fixation operations in fabrication of the core module 2 will be described on the basis of FIG. 3.

In the first place, after the rod lens 20 and the second optical fiber 12 have been subjected to core alignment, a wavelength multiplex (for example $\lambda 1+\lambda 2$) optical signal is input into the first optical fiber 11, as indicated by an arrow in FIG. 3, in the operation of fixing the rod lens 20 and the capillary 14. The input light beam goes through the rod lens 20 and reaches the interference film filter 22. The interference film filter 22 transmits a light beam in a particular wavelength band (for example $\lambda 1$). On the other hand, a light beam in a wavelength band (for example $\lambda 2$) that is other than the particular wavelength band $\lambda 1$ is reflected, as indicated by a dot-and-dash line in FIG. 3. In this connection, the light amount loss is reduced as the portions through which the light beam input from the first optical fiber 11 and the light beam reflected on the interference film filter 22 pass becomes closer to the central axis of the rod lens 20.

In the present embodiment, as FIG. 2(a) shows, the first optical fiber 11 and the second optical fiber 12 are held in contact with each other along the central axis of the capillary 14. Accordingly, the capillary 14 and the rod lens 20 can be mutually adjusted in position in such a way that the central axis of the capillary 14 and the central axis of the rod lens 20 are approximately coaxial. Herewith, the light amount loss of the light beam going through the rod lens 20 can be minimized.

Additionally, the capillary 14 and the rod lens 20 are adjusted in inclination and position, and both are fixed so that the reflected light beam in the wavelength band $\lambda 2$ may be made incident on the second optical fiber 12 in a most satisfactory manner, namely, in a manner carrying the largest amount of light. Thus, as FIG. 3 shows, the reflected light beam in the wavelength band $\lambda 2$ is output from the second optical fiber 12.

Next, in the operation of fixing the rod lens 20 and the mirror 30 after the mirror 30 and the optical fiber 13 have been subjected to core alignment, a wavelength multiplex signal (for example $\lambda 1+\lambda 2$) is input into the first optical fiber 11. The input light beam goes through the rod lens and reaches the interference film filter 22. The light beam in the particular wavelength band (for example $\lambda 1$) selected by the interference film filter 22 passes through the same interference film filter 22; and reaches the mirror 30, as indicated by a dashed line in FIG. 3. The light beam of the wavelength band $\lambda 1$ is reflected on the mirror 30, and again passes through the interference film filter 22 and is made incident on the rod lens 20. In this connection, light amount loss of the incident light beam is reduced as the portion through which the reflected light beam passes becomes closer to the central axis of the rod lens 20.

In the present embodiment, as FIG. 2(a) shows, the capillary 14 has a through hole 15 having an equilateral triangular cross section. The third optical fiber 13 and the first optical fiber 11 contact each other in that through hole 15. More specifically, the third optical fiber 13 is located adjacent to the first optical fiber 11, and is located in the second closest position to the central axis of the capillary 14. (The second optical fiber 12 is in the closest position.) Accordingly, the light amount loss of the reflected light beam passing through the rod lens 20 can be minimized.

Next, the mirror 30 is adjusted in inclination and position so that the incident light beam of the wavelength band $\lambda 1$ may be made incident on the third optical fiber 13 satisfactorily, namely, in a manner carrying the largest amount of light, and the mirror 30 is fixed onto the flat face 20b of the rod lens 20. Consequently, as shown in FIG. 3, the light beam can be output from the optical fiber 13 while the light amount loss caused by the reflection on the mirror 30 is minimized.

In the core module 2 subjected to core alignment as described above, when a wavelength multiplex signal is input into the first optical fiber 11, a selected signal of the wavelength band $\lambda 1$ selected by the interference film filter 22 is output from the optical fiber 13, and the non-selected signal of the wavelength band $\lambda 2$ other than the wavelength band $\lambda 1$ is output from the optical fiber 12. Accordingly, the core module 2 functions as a demultiplexing module.

Additionally, when in the core module 2, an optical signal of the wavelength band $\lambda 1$ passing through the interference film filter 22 is input into the third optical fiber 13, and an optical signal of the wavelength band $\lambda 2$ other than the wavelength band $\lambda 1$ is input into the second optical fiber 12, the core module 2 outputs an optical signal in the wavelength band ($\lambda 1+\lambda 2$) that is a combination of the wavelength bands $\lambda 1$ and $\lambda 2$. Accordingly, the core module 2 functions as a multiplexing module.

As FIG. 1 shows, a holder 25 is fitted and fixed to the capillary 14 in the core module 2, and the core module 2 is, as it is, fitted into the outer tube 40.

As FIG. 1 shows, the right open end of the outer tube 40 and the right end of the core module 2 are aligned with each other, and are coated with an adhesive 33. Thus, the first, second, and third optical fiber 11, 12, 13 are held with the aid of the adhesive 33. An end cap 41 made of metal or plastic is fixed to the left open end of the outer tube 40. Thus, a filter module 1 is constructed.

The filter module 1 thus constructed makes the first optical fiber 11 serve as a first signal port P1 for inputting/outputting of a wavelength multiplex signal, and the second optical fiber 12 serve as a second signal port P2 for inputting/outputting of an optical signal of the wavelength band $\lambda 2$ reflected on the interference film filter 22. Additionally, the filter module 1 makes the third optical fiber 13 serve as a third signal port P3 for inputting/outputting of an optical signal of the wavelength band $\lambda 1$ passing through the interference film filter 22. In this way, the filter module 1 has a function of multiplexing and demultiplexing optical signals in wavelength bands of two types ($\lambda 1$, $\lambda 2$).

According to the embodiment constituted as described above, the following beneficial effects are achieved.

(1) The filter module 1 comprises one refractive index distribution type rod lens 20, and hence the filter module 1 can be made smaller. The number of the components composing the filter module 1 can be reduced, permitting the fabrication of an inexpensive module.

(2) The filter module 1 is constructed with the optical fiber chip 10 holding the three optical fibers 11, 12, 13, which permits arranging all the three ports for inputting/outputting of optical signal on one end of the filter module 1. Accordingly, as FIG. 4 shows, when a plurality of filter modules 1 are connected in cascade to form a multichannel demultiplexing/multiplexing unit 8, the optical fiber wiring for connecting the individual filter modules 1 becomes straightforward so that no large space is needed.

Figure 4:
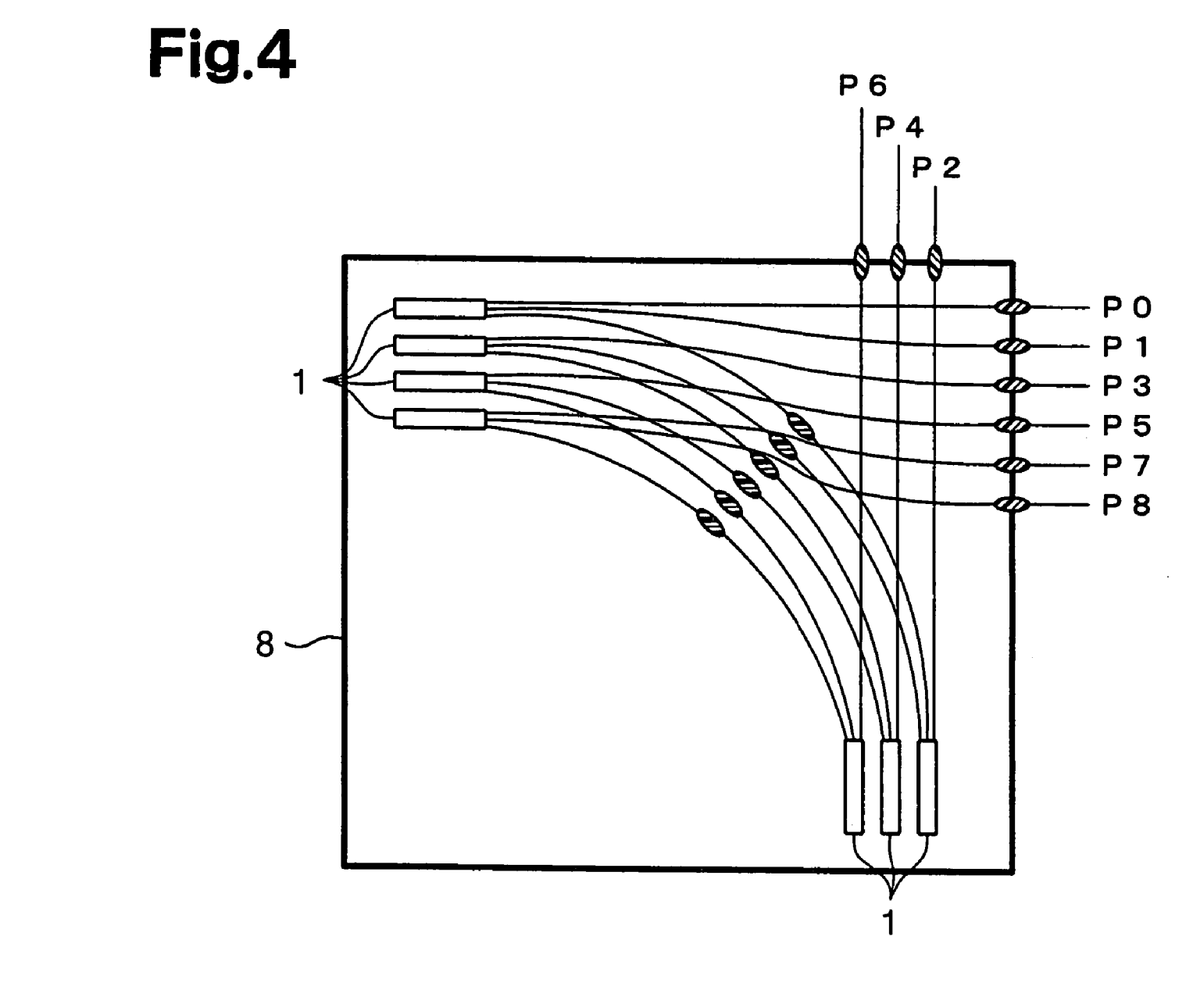
FIG. 4 is a schematic diagram showing the configuration of a multichannel demultiplexing/multiplexing unit constructed with a plurality of filter modules.

Additionally, as FIG. 4 shows, the input/output ports P0 to P8 for inputting/outputting of optical signal in the multichannel demultiplexing/multiplexing unit 8 can be straightforwardly arranged all alike in position. Consequently, the size of the fabricated multichannel demultiplexing/multiplexing unit can be reduced.

(3) The filter module 1 of the present embodiment comprises a rod lens 20 with an interference film filter 22 formed on one end face thereof and a mirror 30. Accordingly, the two conventional core alignment/fixation processes (a) and (d) are unnecessary; namely, the process (a) in which an optical fiber and a rod lens are subjected to core alignment and fixation in order to fabricate a second FC and the process (d) in which two FC's are subjected to core alignment and fixation in the tube. Consequently, the fabrication time is further reduced, the fabrication cost can be reduced, the modularization becomes straightforward, and the product characteristics of a filter module are improved in reliability.

It should be apparent to those skilled in the art that the present invention may be embodied in many other specific forms without departing from the spirit or scope of the invention. Particularly, it should be understood that the invention may be embodied in the following forms.

Figure 5:
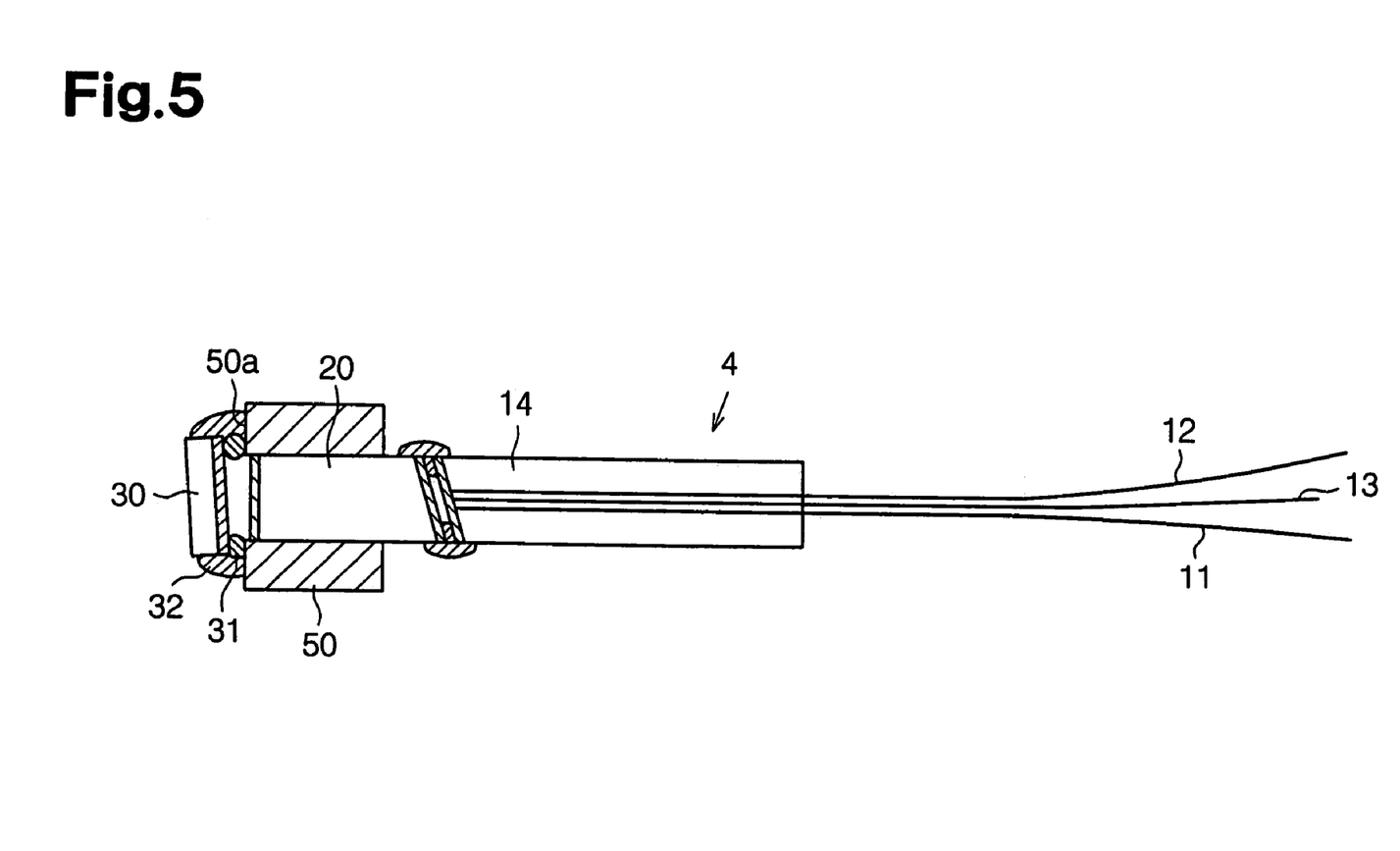
FIG. 5 is a sectional view showing another example of a core module.

In the embodiment, the mirror 30 is bonded onto the flat face 20b of the rod lens 20 to form the core module 2; however another core module 4 may be constructed, as is shown in FIG. 5. More specifically, the core module 4 may be constructed in such a way that the rod lens 20 is fitted into and fixed to a mirror holder 50, and the mirror 30 is bonded onto a ring shape end face 50a of the holder 50 in a manner aligned with core aligned with aid of an adhesive 31.

In the core module 4 thus constructed, the mirror 30 is bonded onto the ring shape end face 50a of the holder 50, and hence the adhesive 31 does not adhere to the flat face 20b of the rod lens 20, permitting ensuring the sufficient optical path for optical signal.

In the embodiment, the cross sectional shape of the through hole 15 provided in the capillary 14 is approximately triangular, but may also be rectangular.

Figure 6:
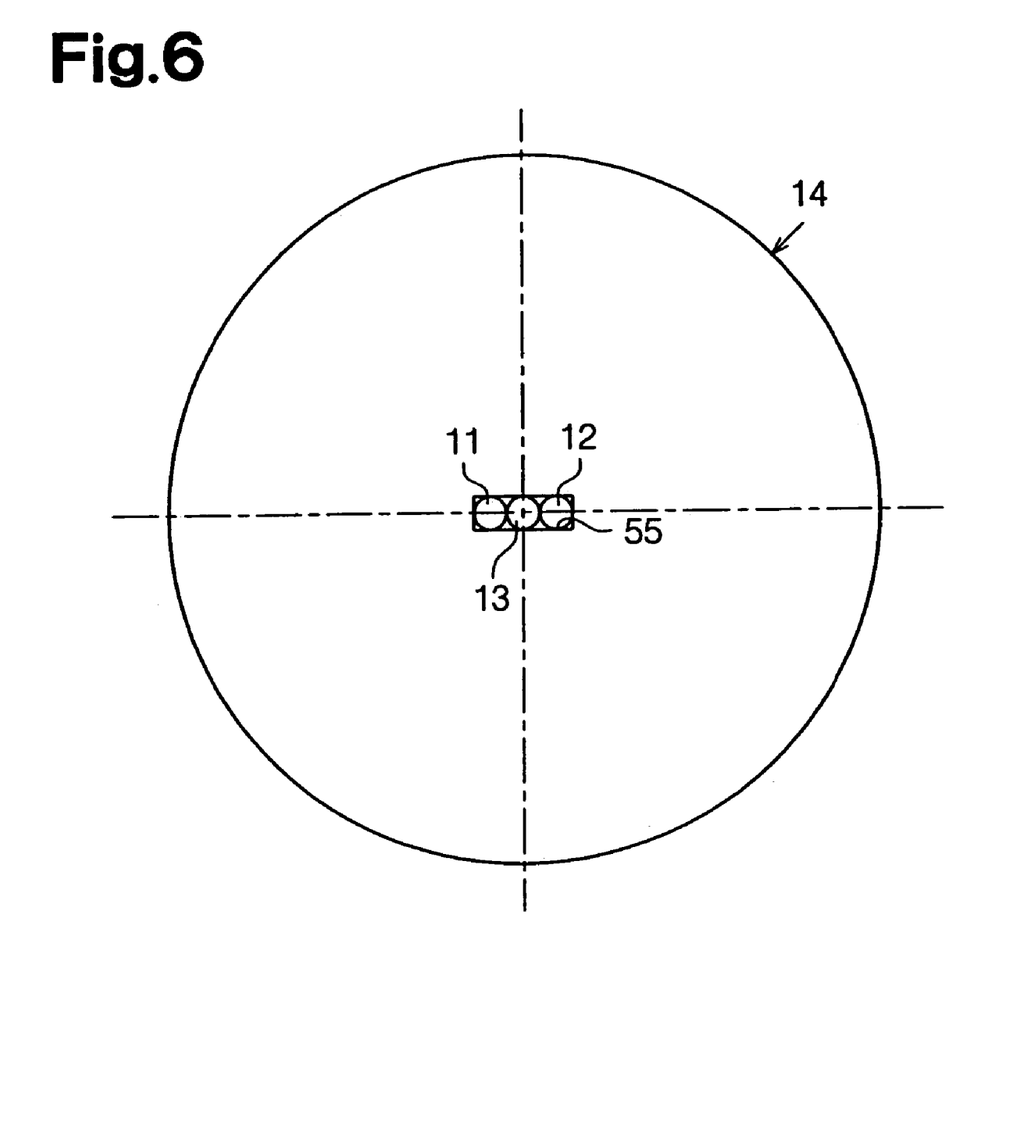
FIG. 6 is a front view showing another example of an optical fiber chip.

FIG. 6 is a sectional view of an optical fiber chip 10 in which a through hole 55 having a cross sectional shape made to be rectangular is formed in the capillary 14.

As FIG. 6 shows, the three optical fibers 11, 12, 13, bundled to make a row in the transverse direction, inscribe the through hole 55 having a rectangular cross section, and are held therein. Additionally, the optical axis of the third optical fiber 13 situated centrally, of the three optical fibers 11, 12, 13, coincides with the central axis of the capillary 14.

In the optical fiber chip 10 thus constructed, core alignment is conducted in such a way that, as for the two side fibers of the three optical fibers bundled in a row, the first optical fiber 11 on one side is made to serve as a first signal port P1 for inputting/outputting of multiplex wavelength signal, and the second optical fiber 12 on the other side is made to serve as a second signal port P2. Then, the rod lens and capillary 14 are bonded. Subsequently, core alignment is conducted in such a way that the third optical fiber 13 situated centrally is made to serve as a third signal port P3, and then the rod lens and mirror are bonded to each other.

In the embodiment, a through hole is provided in the capillary 14 to hold three optical fibers; however, either a through hole capable of holding two optical fibers or a through hole capable of holding one optical fiber may be provided in the capillary 14. More specifically, there may be provided a through hole for holding two optical fibers and another through hole for holding one optical fiber; or there may be provided three through holes each holding an optical fiber.

In the embodiment, a board (mirror 30) with a wavelength independent total reflection mirror is used as a mirror, but the present invention is not limited by the particular mirror so that a board with a wavelength selective transmitting film (hereinafter simply referred to as a "filter board") may be used. More specifically, a core module may be constructed by fabricating a three-port filter module provided with a filter board in place of the mirror 30 of the embodiment shown in FIG. 1.

In the core module thus constituted, a filter module can be constructed in which a new fourth signal port P4 for inputting/outputting of the light beam in the wavelength region selectively passing through the filter board.

Figure 7:
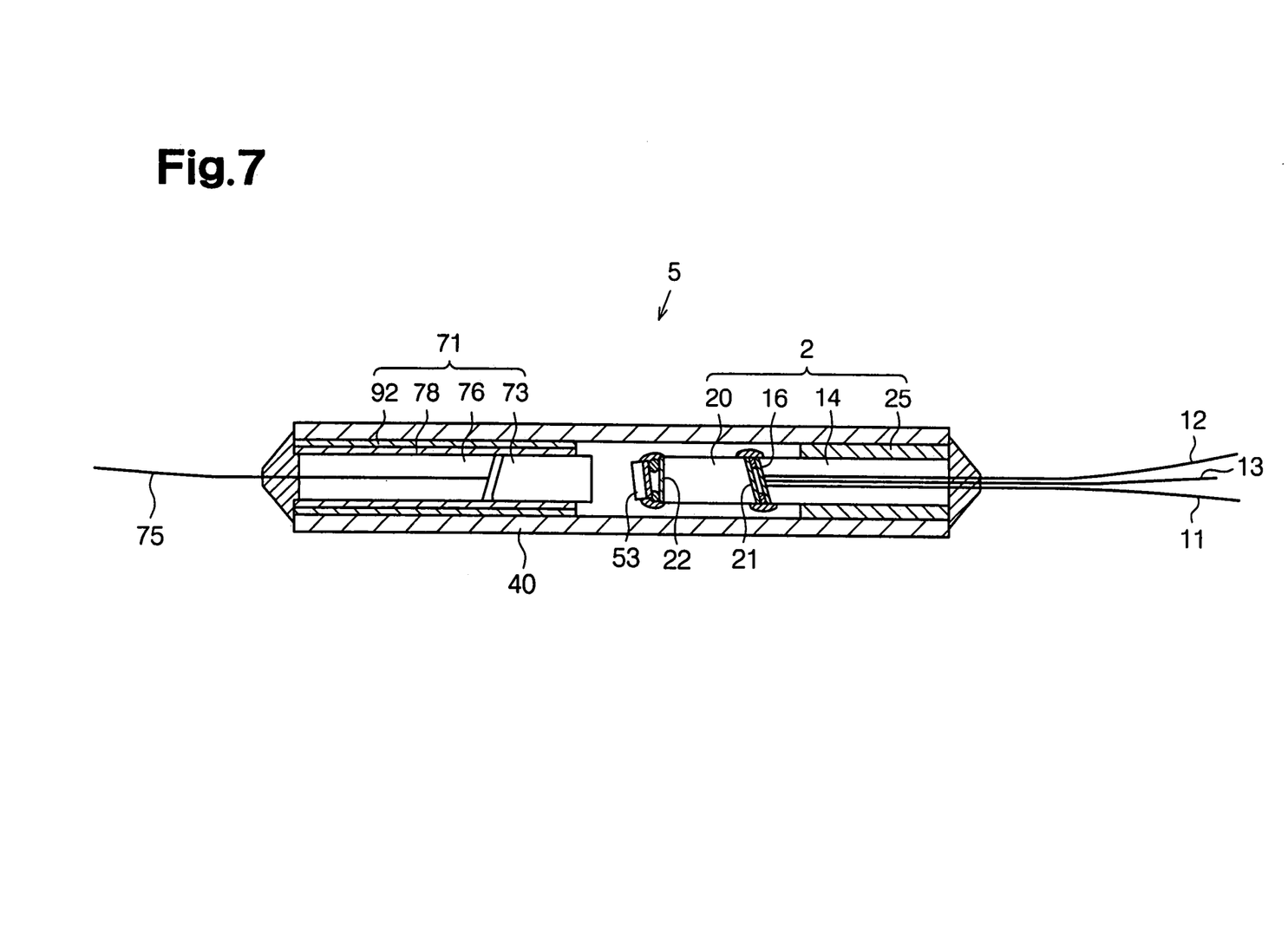
FIG. 7 is a sectional view showing another example of a filter module.
Figure 8:
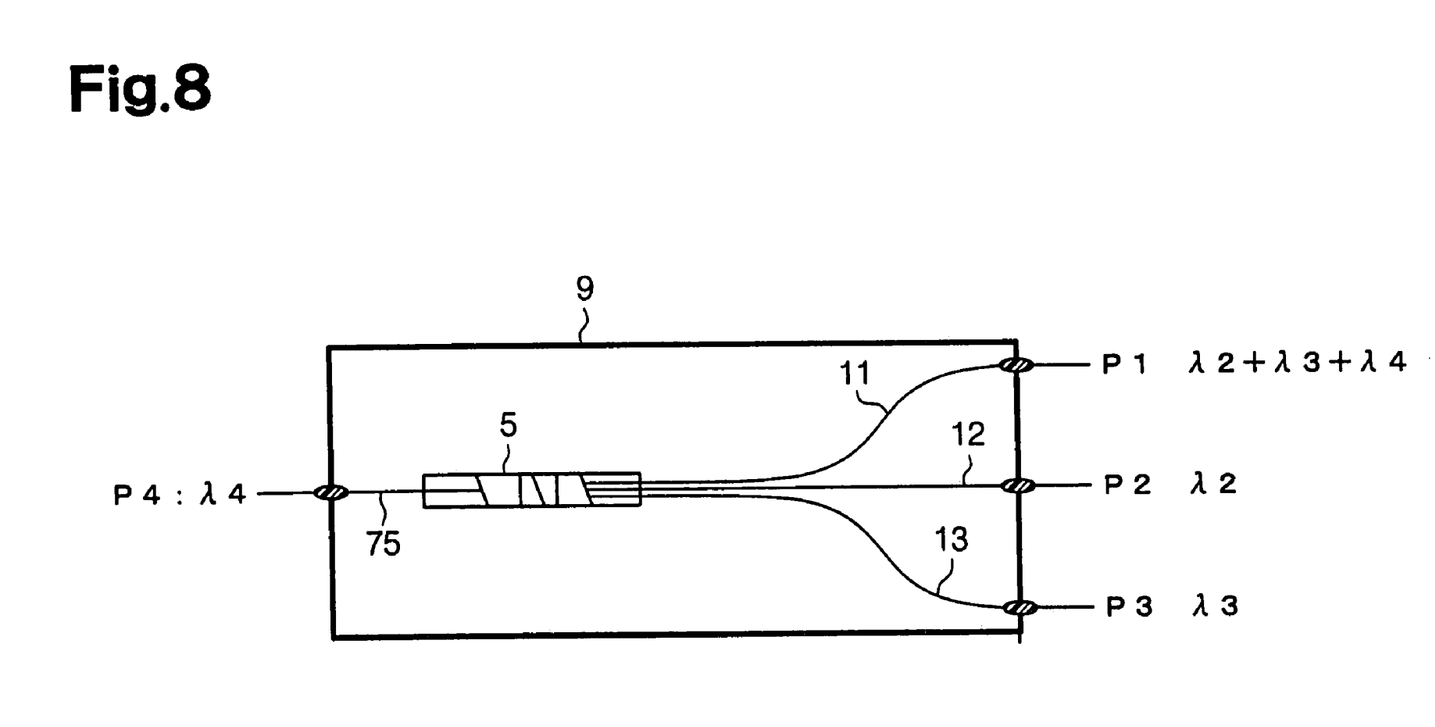
FIG. 8 is a schematic diagram showing the configuration of a four-port filter unit constructed with another example of a filter module.

FIG. 7 is a schematic configurational view showing an example of a four-port filter module 5 thus constructed. Additionally, FIG. 8 is a schematic configurational view illustrating a four-port filter unit 9 as constructed by use of a filter module 5 shown in FIG. 7. As FIG. 7 shows, the four-port filter module 5 is provided with a core module 2 of the three-port filter module equipped with a filter board 53 in place of the mirror 30 in the embodiment shown in FIG. 1.

Additionally, the four-port filter module 5 is provided with a single FC 71 similar to a conventional one, and the outer tube 40. The core module 2 and single FC 71 are subjected to core alignment for mutual axis alignment and inclination alignment to eliminate deviation, and are respectively bonded to be fixed in the outer tube 40 for the purpose of maintaining the aligned arrangement.

The four-port filter unit 9 constructed by use of the four-port filter module 5 thus constructed makes the first optical fiber 11 serve as the first signal port P1 for inputting/outputting of a wavelength multiplex signal. Additionally, the filter unit 9 makes the second optical fiber 12 serve as the second signal port P2 for inputting/outputting of the optical signal in the wavelength band $\lambda 2$ reflected on the interference film filter 22. Additionally, the filter unit 9 makes the third optical fiber 13 serve as the third signal port P3 for inputting/outputting of the optical signal in the wavelength band $\lambda 3$ selectively passing the interference film filter 22 but reflected on the filter board 53.

Yet additionally, the filter unit 9 makes the fourth optical fiber 75 serve as the fourth signal port P4 for inputting/outputting of the optical signal in the wavelength band $\lambda 4$ selectively passing through both of the interference film filter 22 and the filter board 53. Thus, the filter unit 9 has a function for demultiplexing/multiplexing of the optical signals in the three types of wavelength bands ($\lambda 2$, $\lambda 3$, and $\lambda 4$).

Figure 9:
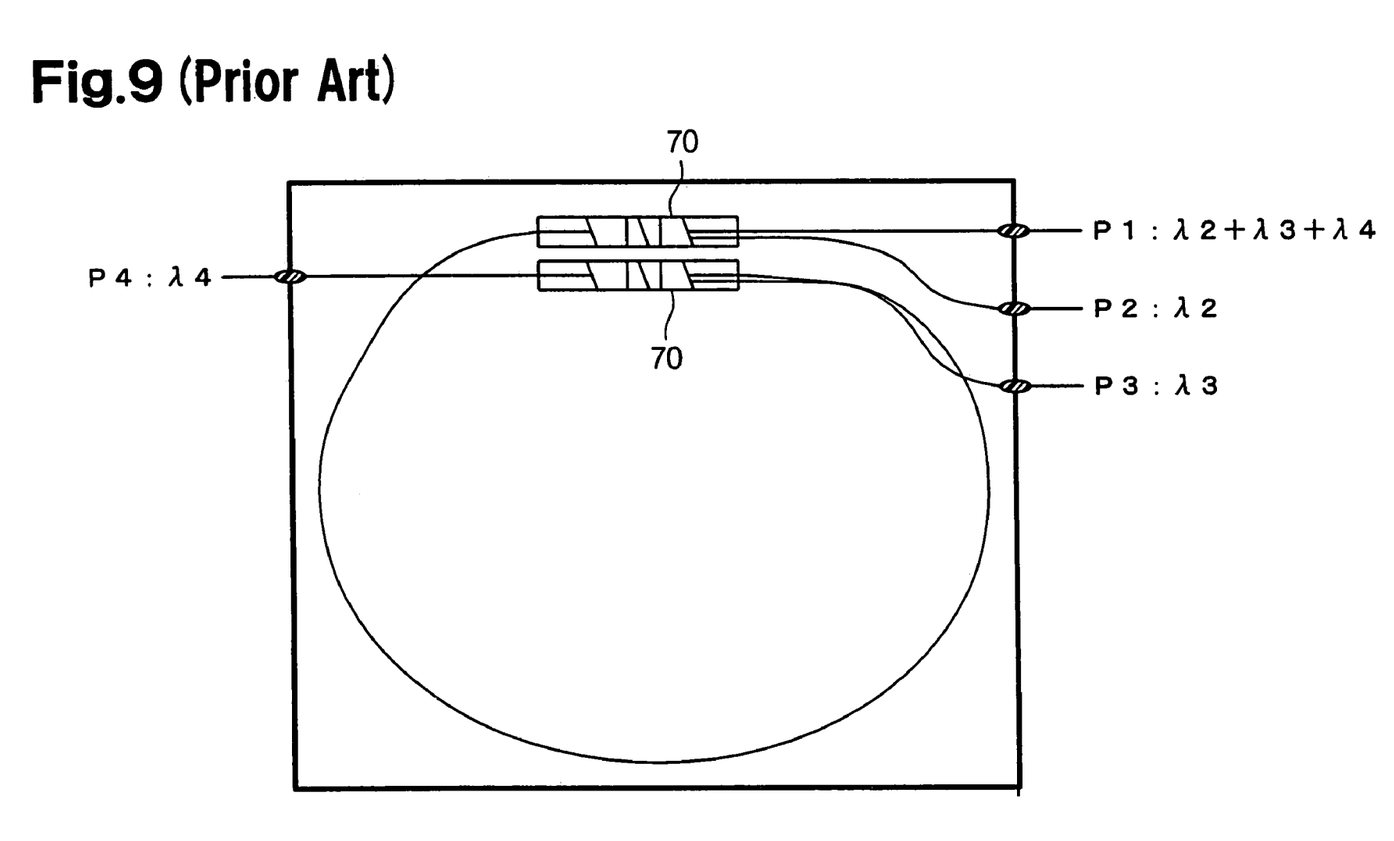
FIG. 9 is a schematic diagram showing the configuration of a four-port filter unit constructed with conventional three-port filter modules.

Conventionally, for constructing such a four-port filter unit, two pieces of conventional three-port filter modules 70 should be connected, as illustrated in FIG. 9. On the contrary, one piece of the four-port filter unit 9 shown in FIG. 8 suffices for that purpose, and hence an effect is achieved that permits miniaturizing the unit and reducing the price of the unit.

In the first embodiment, a bandpass filter is used as interference film filter 22, but the interference film filter 22 is not limited to this bandpass filter; an edge filter or a TAP filter may be used. To sum up, any optical filter can be used that exhibits wavelength selectivity.

Therefore, the present examples and embodiments are to be considered as illustrative and not restrictive and the invention is not to be limited to the details given herein, but may be modified within the scope and equivalence of the appended claims.

What is claimed is:

1. A filter module comprising:

a lens through which an optical signal passes;

three optical fibers including a first, second and third optical fibers;

an optical filter that transmits the optical signal in a particular wavelength band among a wavelength multiplex optical signal and reflects the optical signal in a wavelength band other than the particular wavelength band, and a mirror separated from the optical filter by a gap that reflects the optical signal transmitted through the optical filter, wherein said three optical fibers are contained in the module and are arranged on a single side of said lens, wherein the first optical fiber receives the wavelength multiplex optical signal from the lens or outputs the wavelength multiplex optical signal to the lens, wherein the second optical fiber receives or outputs the optical signal reflected by the filter, and wherein the third optical fiber receives or outputs the optical signal reflected by the mirror after transmitted through the optical filter.

2. The filter module according to claim 1, wherein said lens is a refractive index distribution type rod lens having first and second end faces on opposite sides of the lens, wherein the first end face is coated with said optical filter, and wherein said three optical fibers are arranged on the second end face.

3. The filter module according to claim 1, further comprising a capillary for holding said three optical fibers, wherein the capillary is provided with a single through hole for holding the three optical fibers and wherein the capillary and the lens are cylindrical and the capillary has substantially the same diameter as that of the lens.

4. The filter module according to claim 3, wherein said through hole is formed by three inner walls, wherein said three optical fibers contact each other in said through hole, and each of said three inner walls contacts two optical fibers.

5. The filter module according to claim 1, wherein said mirror is a board having a wavelength independent total reflection mirror, and said mirror is arranged to face said optical filter.

6. The filter module according to claim 1, wherein said optical filter is a wavelength selective transmitting film, and wherein a set of fiber collimators is provided facing said wavelength selective transmitting film.

7. A demultiplexing/multiplexing unit, which is a multi-channel demultiplexing/multiplexing unit formed by connecting in cascade a plurality of filter modules, wherein each of the filter modules comprises a lens through which an optical signal passes, three optical fibers including a first, second and third optical fibers, an optical filter that transmits the optical signal in a particular wavelength band among a wavelength multiplex optical signal and reflects the optical signal in a wavelength band other than the particular wavelength band, and a mirror separated from the optical filter by a gap that reflects the optical signal transmitted through the optical filter; and said three optical fibers are contained in the module and are arranged on a single side of said lens, wherein the first optical fiber receives the wavelength multiplex optical signal from the lens or outputs the wavelength multiplex optical signal to the lens, wherein the second optical fiber receives or outputs the optical signal reflected by the filter, and wherein the third optical fiber receives or outputs the optical signal reflected by the mirror after transmitted through the optical filter.

8. The demultiplexing/multiplexing unit according to claim 7, wherein said lens is a refractive index distribution type rod lens having first and second end faces on opposite sides of the lens, wherein the first end face is coated with said optical filter, and wherein said three optical fibers are arranged on the second end face.

9. The demultiplexing/multiplexing unit according to claim 7, wherein said filter module further comprises a capillary for holding said three optical fibers, and the capillary is provided with a through hole for holding the three optical fibers and wherein the capillary and the lens are cylindrical and the capillary has substantially the same diameter as that of the lens.

10. The demultiplexing/multiplexing unit according to claim 9, wherein said through hole is formed by three inner walls, wherein said three optical fibers contact each other in said through hole, and each of said three inner walls contacts two optical fibers.

11. The demultiplexing/multiplexing unit according to claim 7, wherein said mirror is a board having a wavelength independent total reflection mirror, and said mirror is arranged to face said optical filter.

* * * * *